UNITED STATES PATENT OFFICE.

FRED D. CHENEY, OF GYPSUM, KANSAS.

STORAGE-BATTERY ELECTROLYTE.

1,385,305. Specification of Letters Patent. Patented July 19, 1921.

No Drawing. Application filed March 21, 1921. Serial No. 454,280.

*To all whom it may concern:*

Be it known that I, FRED D. CHENEY, a citizen of the United States, residing at Gypsum city, in the county of Saline and State of Kansas, have invented a new and useful Composition of Matter to be Used for a Storage-Battery Electrolyte.

My composition consists of the following ingredients combined in these proportions, viz:

| | |
|---|---|
| Water distilled | 1 quart |
| Sodium phosphate | 4 ounces |
| Sulfuric acid, (chemically pure) | 1 quart |

The distilled water and sodium phosphate are mixed by heat and agitation after which the sulfuric acid C. P. is added in the proportions as stated.

In using the above combination it should be allowed to cool.

Then wash out the battery in which it is to be used, and pour in the solution in the proportions stated, and charge the battery for two (2) hours in the usual manner.

By the use of the above composition a battery may be charged much more speedily without any harmful effects on the battery.

I am aware that sulfuric acid and water are being used as an electrolyte, but I am not aware that sulfuric acid, water, and sodium phosphate in combination have ever been used.

I claim.

1. The herein described composition of matter consisting of water, sulfuric acid, and sodium phosphate, substantially as described, and for the purpose specified.

2. The herein described composition of matter for storage batteries, consisting of one (1) quart of water, four (4) ounces of sodium phosphate, and one (1) quart of chemically pure sulfuric acid, substantially as described.

FRED D. CHENEY.

Witnesses:
T. R. TINKLER,
R. H. CHENEY.